Patented Sept. 27, 1932

1,879,777

UNITED STATES PATENT OFFICE

ALBERT J. VALLE, OF LOS ANGELES, CALIFORNIA

COMPOSITION FOR TREATING TREES AND OTHER VEGETATION

No Drawing. Application filed July 13, 1927. Serial No. 205,535.

My invention relates to a composition for treating trees, shrubbery, and other vegetation.

The objects of my invention are: first, to provide a composition of this class which, when applied to and around the trunks of trees, or on shrubbery, or other vegetation, will prevent animal life, such as ants, mealy bugs, aphis and caterpillars, from crawling up the tree, shrub, or other vegetation; second, to provide a composition of this class which will not only kill animal life coming in contact therewith, but will hold and check the advance of the animal life toward the top or more tender portions of the tree, and the like; third, to provide a composition of this class which is lasting in its qualities and which will not harden within a short time and thereby destroy its efficacy, particularly when the tree, or other vegetation, is reasonably healthy; fourth, to provide a composition of this class which has unusual penetrating powers and will penetrate into and pass upwardly and downwardly on the trunk, thus preventing animal life from eating into the wood of the trunk and passing upwardly underneath the bark; and fifth, to provide a composition of this class simple and economical to compound, the ingredients of which are economical, and a composition of this class which is very effective and which will not readily deteriorate.

With these and other objects in view, as will appear hereinafter, my composition consists of a certain novel combination of elements, as will be hereinafter described in detail and particularly set forth in the appended claims.

My composition, as above defined, consists in its preferred form of the following ingredients mixed in the proportions indicated:

|  | Ounces |
|---|---|
| Putty | 48 |
| Castor oil | 16 |
| Solution of salts containing sulphur | 2 |

These ingredients are mixed in the proportions stated and agitated until a viscous or pasty substance is obtained. This substance may be easily applied to the trunk of a tree, shrub, or the like, with a brush. A thin layer, or coating of this substance, as a narrow band around the tree, or the like, is all that is necessary for performing the functions intended. This substance, after the same is applied to the tree, will remain in a plastic state for many months, if the tree, or the vegetation on which it is applied, is reasonably healthy.

The putty, above referred to, is preferably a special putty made from whiting, such as "alabastine" and a slow drying oil such as raw fish oil, with the addition of such other oils as is desired to give the desired odor.

The castor oil gives a healing effect to the tree as well as keeps the composition in a plastic state. The castor oil also provides such a quality for the composition, by thorough intermixing with the other ingredients, that the composition cannot be affected by or washed from the tree by water. The castor oil further retains its sticky quality and holds the animal life coming in contact with the composition. Only such oil, or other elements, having the qualities enumerated, or other qualities to give the composition the intended efficacy, can be substituted.

The sulphur containing salt solution consists preferably of sulphur in chemical combination with sodium in the form of sodium polysulphide, sodium thiosulphate, or other sulphides and sulphates of sodium, or similar metal, in solution in water or mixed with any other suitable inert ingredients. The principal element of the solution is the sulphur and fair results may be obtained by a mixture of free sulphur, or a sulphurous substance containing free sulphur, with the remaining ingredients, although more effective and lasting results are obtainable by the solutions of sulphide and sulphate of sodium of similar metallic base.

Though I have described a particular composition for the treatment of trees, shrubs, and the like, and certain proportions of the ingredients and certain modifications of the composition, I do not wish to be limited to the particular composition, the particular proportions of the ingredients, or to the particularly suggested modifications, but desire to include in the scope of my invention the composition substantially as set forth in the appended claims.

Having thus described my invention, what I claim as new and desire to secure by Letters Patent is:

1. A composition for treating trees and the like comprising putty of whiting and slow drying oil, castor oil, and an inorganic sulphur-containing salt.

2. A composition for treating trees and the like comprising putty of whiting and fish oil 48 ounces, castor oil 16 ounces, and a solution of sulphides and sulphates of sodium 2 ounces.

In testimony whereof, I have hereunto set my hand at Los Angeles, California this 7th day of July, 1927.

ALBERT J. VALLE.